United States Patent
Quass et al.

(10) Patent No.: US 11,994,189 B2
(45) Date of Patent: May 28, 2024

(54) TOOTHED BELT

(71) Applicant: ContiTech Antriebssysteme GmbH, Hannover (DE)

(72) Inventors: Jan-Henning Quass, Bergen (DE); Hubert Goeser, Dannenberg (DE); Andre Kucharczyk, Guelden (DE)

(73) Assignee: ContiTech Antriebssysteme GmbH, Hannover (DE)

( * ) Notice: Subject to any disclaimer, the term of this patent is extended or adjusted under 35 U.S.C. 154(b) by 176 days.

(21) Appl. No.: 17/595,622

(22) PCT Filed: Mar. 18, 2020

(86) PCT No.: PCT/EP2020/057479
§ 371 (c)(1),
(2) Date: Nov. 19, 2021

(87) PCT Pub. No.: WO2020/233863
PCT Pub. Date: Nov. 26, 2020

(65) Prior Publication Data
US 2022/0221027 A1 Jul. 14, 2022

(30) Foreign Application Priority Data
May 21, 2019 (DE) ............ 10 2019 207 434.0

(51) Int. Cl.
*F16G 1/28* (2006.01)
*B29D 29/08* (2006.01)
(Continued)

(52) U.S. Cl.
CPC ............ *F16G 1/28* (2013.01); *B29D 29/08* (2013.01); *F16G 1/12* (2013.01); *B29K 2075/00* (2013.01); *B29K 2705/12* (2013.01)

(58) Field of Classification Search
CPC .. F16G 1/28; F16G 1/12; B29D 29/08; B29K 2075/00; B29K 2705/12
USPC ........................................................ 474/205
See application file for complete search history.

(56) References Cited

U.S. PATENT DOCUMENTS

| 2007/0111834 A1* | 5/2007 | Matsuda | F16G 1/28 474/237 |
| 2009/0142572 A1* | 6/2009 | Burlett | F16G 1/08 156/137 |

(Continued)

FOREIGN PATENT DOCUMENTS

| CA | 3022756 A1 | 12/2017 |
| CN | 101384834 A | 3/2009 |

(Continued)

OTHER PUBLICATIONS

International Search Report dated Jul. 2, 2020 of International Application PCT/EP2020/057479 on which this application is based.

(Continued)

*Primary Examiner* — Gene O Crawford
*Assistant Examiner* — Emily R Kincaid
(74) *Attorney, Agent, or Firm* — Gregory Adams; Richard Wolf

(57) ABSTRACT

The present invention relates to a toothed belt (1) having a belt body (10) which extends substantially in a longitudinal direction (X) and which comprises a flexible material, wherein at least one tension member (13), preferably a plurality of tension members (13), is at least substantially embedded in the flexible material of the belt body (10) in the longitudinal direction (X) and is at least substantially enclosed by the flexible material of the belt body (10), wherein the belt body (10) has a toothed side (11) with teeth (14) and tooth spaces (15) which alternate in the longitudinal direction (X). The toothed belt (1) is characterized in that a (Continued)

minimum thickness (a) of the flexible material of the belt body (10) in the vertical direction (Z) on the tension member (13) of at least one tooth space (15), preferably of all tooth spaces (15), corresponds at least to a minimum thickness (h) of the flexible material of the belt body (10) in the vertical direction (Z) on the tension member (13), wherein the minimum thickness (h) is calculated as follows in dependence on the thickness (d) of the tension member (13) in the vertical direction (Z) and on the material hardness (ShA) of the flexible material of the belt body (10) in Shore A:

$h=3*d/ShA.$

20 Claims, 2 Drawing Sheets

(51) Int. Cl.
*F16G 1/12* (2006.01)
*B29K 75/00* (2006.01)
*B29K 705/12* (2006.01)

(56) References Cited

U.S. PATENT DOCUMENTS

| | | | |
|---|---|---|---|
| 2010/0004082 | A1 | 1/2010 | Di Meco et al. |
| 2016/0208889 | A1* | 7/2016 | Yoshida .................. B32B 5/02 |
| 2016/0298725 | A1* | 10/2016 | Ishiguro ................. C08L 21/00 |
| 2017/0051810 | A1* | 2/2017 | Ideguchi ................. F16G 1/08 |

FOREIGN PATENT DOCUMENTS

| | | |
|---|---|---|
| CN | 109196245 A | 1/2019 |
| DE | 102004044218 A1 | 3/2006 |
| EP | 3040579 A1 | 7/2016 |
| GB | 2252774 A | 8/1992 |
| JP | 2011163445 A | 8/2011 |
| JP | 2016211734 A | 12/2016 |

OTHER PUBLICATIONS

Chinese Office Action dated Jan. 20, 2023 of counterpart CN application 202080050861.4.

* cited by examiner

TOOTHED BELT

The present invention relates to a toothed belt according to the preamble of patent claim 1, to a method for producing such a toothed belt as claimed in patent claim 6, to a method for producing such a toothed belt as claimed in patent claim 10 and to a method for producing such a toothed belt as claimed in patent claim 11.

In drive technology, belts are used for force transmission in various technical fields. For force transmission, e.g. in an internal combustion engine, a belt may be configured as a flexible, endless closed strip. Belts may however also be used with two open ends, for example in elevator systems, in order to move an elevator car in height.

Such belts are today normally produced substantially from a flexible material, for example an elastomer material, e.g. rubber, or for example a plastic such as polyurethane (abbreviated to: PU), as flexible belt bodies in which tension members, for example steel cables or textile tension members, are embedded in the direction of the force transmission, that is to say in the movement direction. The belt has at least one profiled side which during use comes into contact with at least one drive roller and possibly also with at least one deflection roller. The belt may thereby be driven and at the same time guided. Depending on the application, the profiling of the drive side of the belt may be configured transversely with respect to the movement direction, for example as teeth, or in the movement direction, for example as wedges or as V-ribs.

To produce toothed belts from polyurethane, use is usually made of profiled rolls as shaping cores or as shaping wheels in order to provide the toothing of the belt on its toothed side. In this case, the tension members are deposited on the outer diameter of the rolls such that the tension members can come into direct contact with the roll. In other words, during revolution around the roll, the tension members are pushed out of the PU material partially on the drive side, such that the tension members of the finished belt are free from the PU material on the drive side at least in a punctiform manner. In this way, the tension members may be exposed to environmental influences at these exposed points of the drive side.

Depending on the environmental influences and depending on the material of the tension members, this may lead to damage to the tension members and possibly to failure of the tension members. If use is for example made of steel cables which run in the movement or longitudinal direction of the belt and are possibly of endless closed form, the contact with the humidity of the ambient air may lead to corrosion at the exposed points. This may be the case in particular in uses outside of buildings, for example in wind turbines. If the wind turbines are at sea (so-called off-shore wind turbines) or at least on land (so-called on-shore wind turbines) near the coast, the corrosion may be intensified due to the elevated salt content of the ambient air.

In the case of such belts, the process of covering the drive side of the belt with a fabric layer is also known. The fabric can have good stretch properties in the movement or longitudinal direction of the belt, such that the elasticity of the flexible belt body is not limited or is at least limited only to an insignificant extent, but the fabric can prevent abrasion of the drive side of the flexible belt body. This may lead to a reduction in wear and lower noise.

Correspondingly, the fabric layer can then come into contact with the exposed points of the tension members of the drive side. This may not prevent the corrosion of the steel cables as tension members since the moisture may be transported toward the steel cables through the capillaries of the fabric layer. In fact, the corrosion may even be further promoted and accelerated in that the fabric layer can serve as a moisture store and thus prolong the exposure time of the moisture. This also applies to humidity having an elevated salt content.

To protect steel cables as tension members, it is therefore known to provide the latter with a zinc layer, such that the risk of corrosion can be avoided or at least reduced. However, the effect of the zinc layer is limited, with the result that corrosion can only partially be avoided. This applies in particular to uses with humidity having an elevated salt content. The coating with zinc also leads to further costs in the production of the belt.

It is an object of the present invention to provide a toothed belt of the type mentioned in the introduction such that exposed tension members can be avoided. It is preferably sought to achieve this in the simplest and/or most cost-effective manner possible. It is at least sought to provide an alternative to known toothed belts of this kind.

The object is achieved according to the invention by a toothed belt having the features as claimed in patent claim 1, by a method having the features as claimed in patent claim 6, by a method having the features as claimed in patent claim 10 and by a method having the features as claimed in patent claim 11. Advantageous developments are described in the dependent claims.

The present invention thus relates to a toothed belt having a belt body which extends substantially in a longitudinal direction and which comprises a flexible material, wherein at least one tension member, preferably a plurality of tension members, is at least substantially embedded in the flexible material of the belt body in the longitudinal direction and is at least substantially enclosed by the flexible material of the belt body, wherein the belt body has a toothed side with teeth and tooth spaces which alternate in the longitudinal direction.

The longitudinal direction corresponds to the movement direction of the toothed belt during operation. The tension member, which may also be referred to as tension strand, is preferably an element extending in elongate fashion in the longitudinal direction, preferably in the form of a strand composed of glass fibers or aramid fibers or in the form of a steel cable, as is described in yet more detail further below.

The toothed belt according to the invention is characterized in that a minimum thickness of the flexible material of the belt body in the vertical direction on the tension member of at least one tooth space, preferably of all tooth spaces, corresponds at least to a minimum thickness (h) of the flexible material of the belt body in the vertical direction on the tension member, wherein the minimum thickness (h) is calculated as follows in dependence on the thickness (d) of the tension member in the vertical direction and on the material hardness (ShA) of the flexible material of the belt body in Shore A:

$$h = 3 * d / ShA.$$

In other words, at least one tooth space has, at its thinnest point in the vertical direction, a minimum thickness in relation to the tension member, said minimum thickness being equal to or greater than a predetermined minimum thickness. In this way, it is possible to ensure that the tension member—at least in the production state, that is to say before use—is covered on the toothed side in the vertical direction at least by a thickness of the flexible material of the belt body in relation to the surroundings. This can prevent the exposure of the tension member, with the result that the tension member can be protected from environmental influences which may lead to damage to the tension member and therefore reduce the service life of the tension member and thus the service life of the entire toothed belt.

According to the invention, the predetermined minimum thickness of the flexible material of the belt body is based, firstly, on the power class of the toothed belt, which usually determines the thickness of the tension member in the vertical direction. The higher the power class of the toothed belt, the thicker the tension member in the vertical direction and the greater the predetermined minimum thickness of the flexible material of the belt body. According to the invention, the predetermined minimum thickness of the flexible material of the belt body is based, secondly, on the hardness of the flexible material of the belt body in Shore A. The harder the flexible material of the belt body, measured in Shore A, the lower the deformation of the flexible material of the belt body is and the thinner the predetermined minimum thickness of the flexible material of the belt body can be.

It is advantageous here for the criterion according to the invention of a minimum thickness of the flexible material of the belt body to be applied to all the tooth spaces of the toothed belt, such that the advantages achieved thereby can be utilized in all the tooth spaces of the toothed belt.

According to one aspect of the invention, the minimum thickness of the flexible material of the belt body in the vertical direction on the tension member of at least one tooth space, preferably of all tooth spaces, furthermore corresponds approximately to the minimum thickness of the flexible material of the belt body in the vertical direction on the tension member. In other words, the tooth space meets the criterion according to the invention of a minimum thickness of the flexible material of the belt body, but without exceeding it to a significant extent. This can be achieved, for example, in that the minimum thickness of the flexible material of the belt body is exceeded by only about 10%, such that manufacturing tolerances can be compensated and the criterion according to the invention of a minimum thickness of the flexible material of the belt body can be reliably observed. In this way, an excessive thickness of the flexible material of the belt body in the tooth space, which could lead to an elevated increase in weight of the toothed belt and to increased material costs of the production operation, without offering any additional benefit, can be avoided.

According to a further aspect of the invention, the flexible material of the belt body comprises polyurethane, preferably the flexible material of the belt body is polyurethane. In this way, the mechanically advantageous properties of the polyurethane can be applied to a toothed belt according to the invention.

According to a further aspect of the invention, the tension member is a steel cable, wherein the thickness of the tension member is the diameter of the steel cable. Relatively high forces can be transmitted in the longitudinal direction by a steel cable as tension member. In the case of steel cables as tension members, the present invention can also be brought to bear with particular effect in order to protect the steel cables from corrosion.

According to a further aspect of the invention, a fabric is arranged on the flexible material of the belt body on the toothed side in the vertical direction. In this way, it is for example possible to reduce the coefficient of friction of the toothed side and protect the toothed side of the toothed belt.

The present invention also relates to a method for producing a toothed belt as described above, having at least the steps of:

producing a toothed belt by means of at least one profiled roll as shaping core, identifying at least one exposed point of at least one tension member on the toothed side, and closing the identified exposed point of the tension member by application of a flexible material such that the minimum thickness of the flexible material of the belt body in the vertical direction on the tension member is achieved.

In other words, a known toothed belt as described in the introduction can be produced in a conventional manner, which may lead to the formation, as described in the introduction, of points of the tension member that are exposed in a punctiform manner. At least one such exposed point of the tension member can then be identified by a person or by a technical inspection device. This can preferably be effected visually, since the material of the tension member, for example on account of its color, on account of its surface structure, etc., can differ sufficiently from the surrounding flexible material of the belt body.

The identified exposed point of the tension member can subsequently be closed by the person or by an application device in that a flexible material is applied on the toothed side at least where the exposed point of the tension member has been identified. This is carried out to such an extent that the minimum thickness of the flexible material of the belt body in the vertical direction on the tension member is achieved at the exposed point thereof, as described above.

According to one aspect of the invention, the application is effected as application of a coating layer, as adhesive bonding of a film or as welding-on of a film. A coating layer may be applied, in particular manually by a person, by means of a brush or the like as a coating liquid, which is subsequently hardened for example by drying. A film is understood to mean a thin sheetlike structure which can be applied in a materially bonded manner to the toothed side for example by adhesive bonding or welding. The use of a film makes it possible to effect relatively large-area coverage, such that, where appropriate, a plurality of exposed points of the tension member that are sufficiently close to one another can be covered in one work step.

According to a further aspect of the invention, where a film is used, the film comprises a fabric on the side facing away from the belt body. In other words, a film comprising on one side a fabric which can be used, for example, to reduce the coefficient of friction is first produced separately. The fabric-free side of the film is then applied, as described above, to the toothed side of the belt body such that the fabric points outward, that is to say away from the belt body. In this way, a fabric can be provided, as described above, in the case of the toothed belt according to the invention.

According to a further aspect of the invention, a flexible material is applied with the material of the belt body. In other words, the same material as comprised by the flexible belt body is used for the material to be applied, for example as a coating or film. This makes it possible to avoid different material properties. A connection between the materials can also be promoted, as a result of which the service life of the toothed belt according to the invention can be increased. The production costs can also be reduced in this way, since it is necessary to procure, store and process fewer different materials.

The present invention also relates to a method for producing a toothed belt as described above, having at least the steps of:
- producing a flat belt having at least one tension member as belt body such that the toothed side has at least the minimum thickness of the flexible material of the belt body in the vertical direction on the tension member, and
- forming the teeth of the toothed belt on the toothed side on the flat belt as belt body.

In other words, a toothed belt according to the invention can initially be produced in a conventional manner as a flat belt, such that the flat belt corresponds to the belt body of the toothed belt according to the invention. This can take place by means of a first stage of a two-stage extrusion process. As a result of this method step, the belt body can be configured as a flat belt together with tension member such that the minimum thickness according to the invention of the flexible material of the belt body in the vertical direction on the tension member is provided. In this state, the flat belt can harden, with the result that the tension member can no longer be pushed out of the flexible material of the belt body.

In a further step, as second stage of the two-stage extrusion process, the teeth of the toothed belt can then be formed on the toothed side on the flat belt as belt body as described in the introduction by means of a profiled roll as shaping core or as shaping wheel. In this case, during revolution around the roll, it is no longer possible for the tension member to be pushed out of the flexible material of the belt body, since the flat belt as belt body has already hardened sufficiently to prevent this.

The present invention also relates to a method for producing a toothed belt as described above, having at least the steps of:
- producing a flat belt having at least one tension member as belt body, and
- forming the teeth of the toothed belt on the toothed side on the flat belt as belt body such that the toothed side has at least the minimum thickness of the flexible material of the belt body in the vertical direction on the tension member.

As an alternative to the method described above, a toothed belt according to the invention can also be produced by producing a flat belt. The toothing is subsequently applied to the toothed side of the flat belt as belt body, wherein not only are the teeth themselves formed, but material is also applied in the tooth spaces such that there at least the minimum thickness of the flexible material of the belt body in the vertical direction on the tension member can be achieved.

According to one aspect of the invention, the method comprises at least the further step of:
- applying a fabric to the toothed side of the toothed belt.

In this way, the friction or the coefficient of friction of the toothed side can be influenced and in particular reduced. The flexible material of the belt body can thereby also be protected in order to prevent or at least reduce abrasion. In this way, it is in particular possible to ensure, and increase the longevity of, the predetermined minimum thickness of the flexible material of the belt body in the vertical direction in the course of operation.

Two exemplary embodiments and further advantages of the invention are discussed below in conjunction with the following figures, in which.

The description of the aforementioned figures is given in Cartesian coordinates with a longitudinal direction X, a transverse direction (not illustrated) which is oriented perpendicularly to the longitudinal direction X, and a vertical direction Z which is oriented perpendicularly both to the longitudinal direction X and to the transverse direction. The longitudinal direction X may also be referred to as depth X, the transverse direction may also be referred to as width and the vertical direction Z may also be referred to as height Z.

Figure 1:
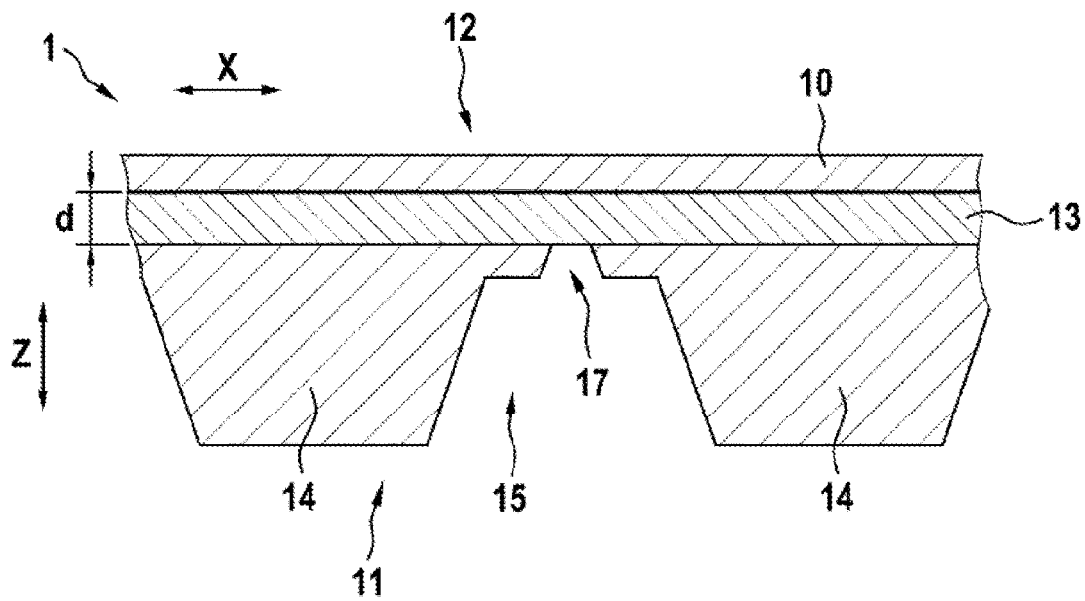
FIG. 1 shows a schematic longitudinal section of a known toothed belt.

FIG. 1 shows a schematic longitudinal section of a known toothed belt 1. The toothed belt 1 has a belt body 10 which extends substantially in the longitudinal direction X and which is composed of polyurethane (PU) as a flexible material. In the flexible material of the belt body 10, a plurality of tension members 13 are arranged in the longitudinal direction X so as to run parallel to one another in the transverse direction. The tension members 13 are each embedded substantially in the flexible material of the belt body 10 and enclosed substantially to completely by the flexible material of the belt body 10. Steel cables 13 are used as tension members 13.

The toothed belt 1 has a drive side 11 and an outer side 12 facing away from the latter in the vertical direction Z. Teeth 14 and tooth spaces 15 which alternate in the longitudinal direction X are formed on the drive side 11, which is why the drive side 11 may also be referred to as toothed side 11.

During the production of such a known toothed belt 1 by means of profiled rolls as shaping cores or as shaping wheels for the formation of the teeth 14 and tooth spaces 15 of the toothed belt 1 on the toothed side 11 thereof, the tension members 13 are deposited on the outer diameter of the rolls such that the tension members 13 can come into direct contact with the roll. In this way, during revolution around the roll, the tension members 13 may be pushed out of the flexible material of the belt body 10 partially on the toothed side 11, such that the tension members 13 of the finished toothed belt 1 are free from the flexible material of the belt body 10 on the toothed side 11 at least in a punctiform manner. This may lead to the formation of exposed points 17 of the tension members 13, with the result that the tension members 13 may be exposed at these exposed points 17 of the toothed side 11 to environmental influences, for example humidity, which may lead to corrosion in the case of steel cables 13 as tension members 13.

Figure 2:
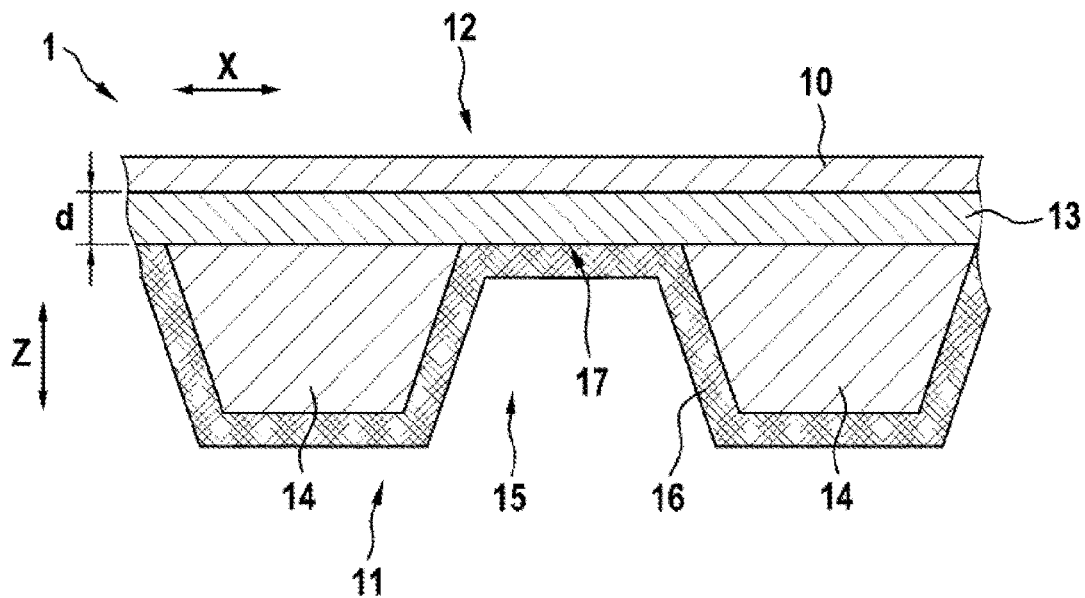
FIG. 2 shows a schematic longitudinal section of a known toothed belt with fabric on the toothed side.

FIG. 2 shows a schematic longitudinal section of a known toothed belt 1 with fabric 16 on the toothed side 11. In this case, the toothed side 11 of the toothed belt 1 is covered completely by a fabric 16, the inner side of which is in contact with the flexible material of the belt body 10. In this way, the fabric 16 also comes into direct contact with the aforementioned exposed points 17 of the toothed side 11, such that even in this case the tension members 13 may be exposed at these exposed points 17 of the toothed side 11 to environmental influences, for example humidity. Here, the fabric 16 may even further promote and accelerate the corrosion in that the fabric 16 can serve as a moisture store and thus prolong the exposure time of the moisture.

Figure 3:
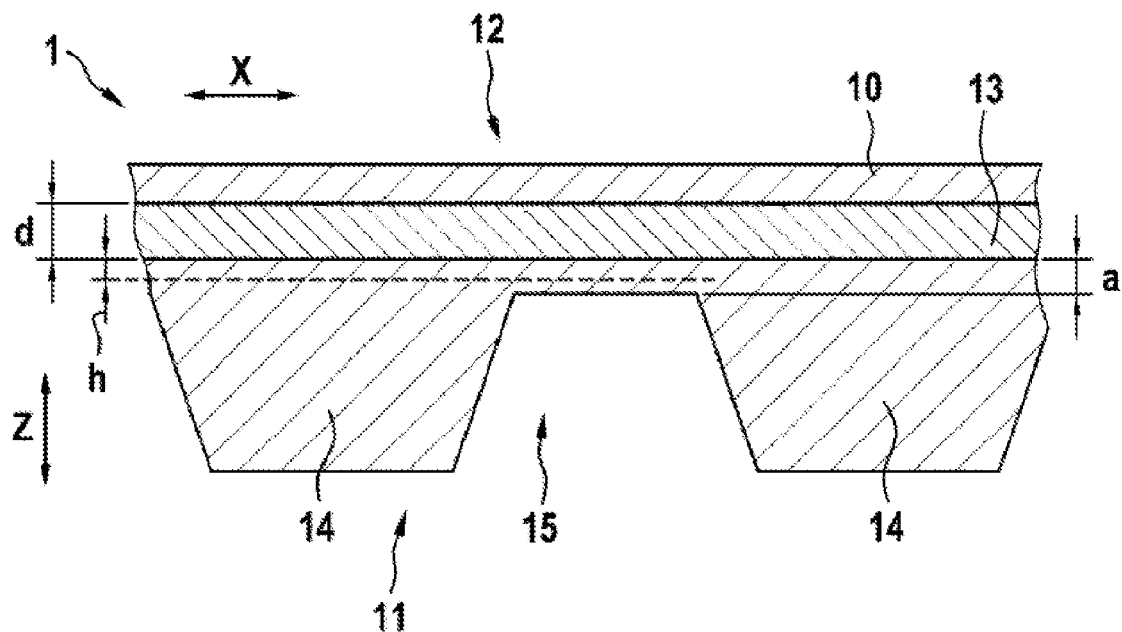
FIG. 3 shows a schematic longitudinal section of a toothed belt according to the invention according to a first exemplary embodiment.

FIG. 3 shows a schematic longitudinal section of a toothed belt 1 according to the invention according to a first exemplary embodiment. According to the invention, in the tooth spaces 15 of the toothed side 11, which have the lowest material thickness of the flexible material of the belt body 10 in the vertical direction Z on the tension member 13, a minimum thickness a of the flexible material of the belt body 10 is provided, said minimum thickness corresponding at least to a minimum thickness h of the flexible material of the belt body 10 in the vertical direction Z on the tension member 13.

The minimum thickness h is calculated as follows in dependence on the thickness d of the tension member 13 in the vertical direction Z and on the material hardness ShA of the flexible material of the belt body 10 in Shore A:

$$h=3*d/ShA.$$

In other words, the tension members 13 are covered in the region of the tooth spaces 15 at least by a minimum thickness a of the flexible material of the belt body 10 in the vertical direction Z, said minimum thickness being equal to or greater than the minimum thickness h. This applies at least in the production state of the toothed belt 1 according to the invention. Here, it may be sufficient to observe the predetermined minimum thickness h of the flexible material of the belt body 10 and to not exceed it to a significant extent in order to not increase the weight of the toothed belt 1 unnecessarily and to use as little flexible material as possible.

According to the invention, account is in this way taken of the fact that the predetermined minimum thickness h of the flexible material of the belt body 10 is based, firstly, on the power class of the toothed belt 1, which usually determines the thickness d of the tension member 13 in the vertical direction Z. The higher the power class of the toothed belt 1, the thicker the tension member 13 in the vertical direction Z and the greater the predetermined minimum thickness h of the flexible material of the belt body 10 in the vertical direction Z on the tension member 13 is. The predetermined minimum thickness h of the flexible material of the belt body 10 is based, secondly, on the hardness ShA of the flexible material of the belt body 10 in Shore A. The harder the flexible material of the belt body 10, the lower the deformation of the flexible material of the belt body 10 is and the thinner the predetermined minimum thickness h of the flexible material of the belt body 10 can be.

The predetermined minimum thickness h of the flexible material of the belt body 10 can be achieved for example by covering identified exposed points 17 manually with, for example, a coating, or in an areal manner by the adhesive bonding or welding-on of films in corresponding sizes in the form of film pieces. Alternatively, the toothed side 11 of the toothed belt 1 may also be formed on a flat belt as belt body 10 that has already been produced. In this case, the predetermined minimum thickness h of the flexible material of the belt body 10 may have already been achieved by the formation of the flat belt or during the application of the teeth in that the tooth spaces are provided correspondingly with the flexible material.

In any case, the tension members 13 can be protected from external environmental influences in a more effective manner than hitherto known. This can in particular help to avoid the development of corrosion in the case of steel cables 13 as tension members 13. In this way, the longevity of the toothed belt 1 can be increased.

Figure 4:
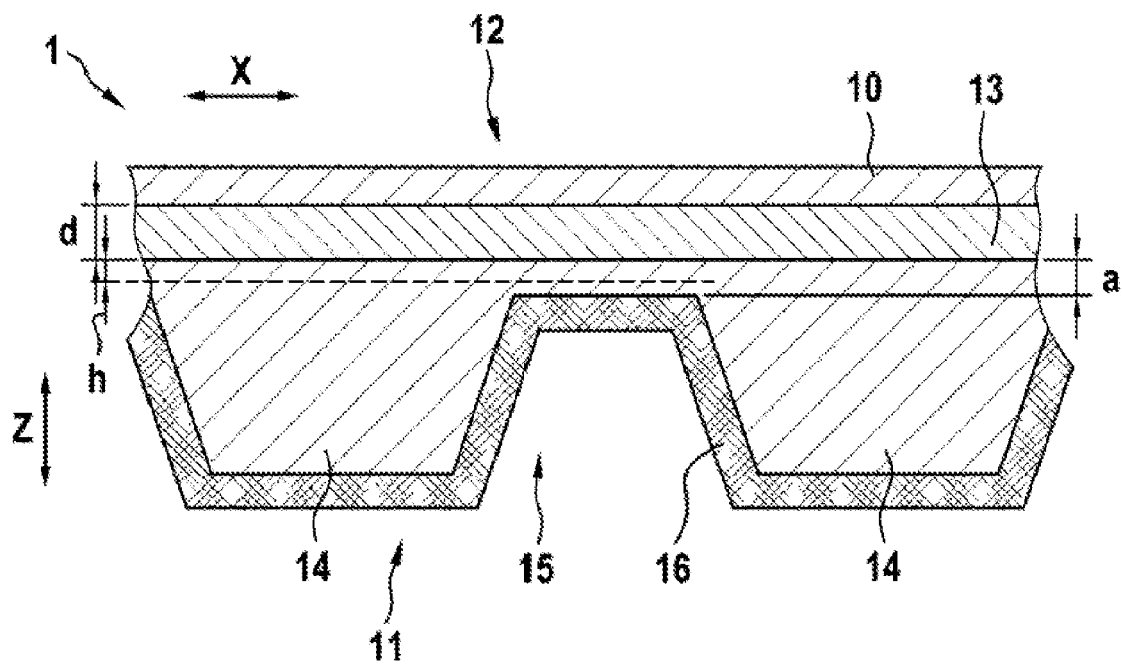
FIG. 4 shows a schematic longitudinal section of a toothed belt according to the invention according to a second exemplary embodiment.

FIG. 4 shows a schematic longitudinal section of a toothed belt 1 according to the invention according to a second exemplary embodiment. In this case, the toothed side 11 is covered by a fabric 16 in order, for example, to reduce the coefficient of friction of the toothed side 11. On account of the predetermined minimum thickness h of the flexible material of the belt body 10, the fabric 16 does not come into direct contact with the tension members 13.

LIST OF REFERENCE DESIGNATIONS (PART OF THE DESCRIPTION)

a Minimum thickness of the flexible material of the (PU) belt body 10 in the vertical direction Z on the tension member 13 of a tooth space 16
d Thickness of the tension member 13 in the vertical direction Z; diameter of the tension member 13
h Minimum thickness of the flexible material of the (PU) belt body 10 in the vertical direction Z on the tension member 13
ShA Material hardness of the flexible material of the (PU) belt body 10 in Shore A
X Longitudinal direction; depth
Z Vertical direction; height
1 Toothed belt
10 (PU) belt body
11 Toothed side; drive side
12 Outer side
13 Tension members; steel cables
14 Teeth of the toothed side 11
15 Tooth spaces of the toothed side 11
16 Fabric
17 Exposed point of a tension member 13 on the toothed side 11

The invention claimed is:

1. A toothed belt comprising a belt body which extends substantially in a longitudinal direction (X) and which comprises a flexible material;
   wherein at least one tension member is at least partially embedded in a flexible material of the belt body in the longitudinal direction (X), and wherein the at least one tension member is at least partially enclosed by the flexible material of the belt body;
   wherein the belt body has a toothed side with teeth and tooth spaces which alternate in the longitudinal direction (X);
   wherein a minimum thickness (a) of the flexible material of the belt body in a vertical direction (Z) on the at least one tension member of at least one of the tooth spaces corresponds at least to a minimum thickness (h) of the flexible material of the belt body in the vertical direction (Z) on the at least one tension member;
   wherein the minimum thickness (h) is calculated as follows in dependence on thickness (d) of the tension member in the vertical direction (Z) and on material hardness (ShA) of the flexible material of the belt body in Shore A, where h=3*d/ShA.

2. The toothed belt as claimed in claim 1, wherein the minimum thickness (a) of the flexible material of the belt body in the vertical direction (Z) on the tension member of at least one tooth space furthermore corresponds approximately to the minimum thickness (h) of the flexible material of the belt body in the vertical direction (Z) on the tension member.

3. The toothed belt as claimed in claim 1, wherein the flexible material of the belt body comprises polyurethane.

4. The toothed belt as claimed in claim 3, wherein the flexible material of the belt body consists of polyurethane.

5. The toothed belt as claimed in claim 1, wherein the at least one tension member is a steel cable (13), and wherein the thickness (d) of the at least one tension member (13) is the diameter (d) of the steel cable.

6. The toothed belt as claimed in claim 1, wherein a fabric is arranged on the flexible material of the belt body on the toothed side in the vertical direction (Z).

7. The toothed belt as claimed in claim 1, wherein the minimum thickness (a) of the flexible material of the belt body in the vertical direction (Z) on the at least one tension member of all of the tooth spaces corresponds at least to a minimum thickness (h) of the flexible material of the belt body in the vertical direction (Z) on the at least one tension member.

8. The toothed belt as claimed in claim 1, wherein at least one tension member is a plurality of tension members.

9. The toothed belt as claimed in claim 8, wherein the minimum thickness (a) of the flexible material of the belt body in the vertical direction (Z) on the plurality of tension members of all of the tooth spaces corresponds at least to a minimum thickness (h) of the flexible material of the belt body in the vertical direction (Z) on the plurality of tension members.

10. The toothed belt as claimed in claim 1, wherein at least one tension member is a plurality of tension members, wherein the plurality of tension members is a plurality of steel cables, and provided the plurality of steel cables are devoid of a zinc layer.

11. The toothed belt as claimed in claim 10, wherein the flexible material of the belt body consists of polyurethane.

12. A method for producing a toothed belt as claimed in claim 1, the method comprising the steps of:
producing the toothed belt using at least one profiled roll as shaping core;
identifying at least one exposed point of the at least one tension member on the toothed side; and,
closing the identified exposed point of the at least one tension member (13) by application of the flexible material such that the minimum thickness (h) of the flexible material of the belt body in the vertical direction (Z) on the at least one tension member is achieved.

13. The method for producing a toothed belt as claimed in claim 12, wherein the application of the flexible material is provided as a coating layer of the flexible material.

14. The method for producing a toothed belt as claimed in claim 12, wherein the application of the flexible material is provided by adhesive bonding of a film of the flexible material.

15. The method for producing a toothed belt as claimed in claim 12, wherein the application of the flexible material is provided by welding-on of a film of the flexible material.

16. The method for producing a toothed belt as claimed in claim 12, wherein the application of the flexible material is provided in the form of a film, and wherein the film comprises a fabric on a side facing away from the belt body.

17. The method for producing a toothed belt as claimed in claim 12, wherein the flexible material is applied along with the material of the belt body.

18. A method for producing a toothed belt as claimed in claim 1, the method comprising the steps of:
producing a flat belt comprising the at least one tension member and the belt body, wherein the toothed side has at least the minimum thickness (h) of the flexible material of the belt body in the vertical direction (Z) on the at least one tension member; and,
forming the teeth of the toothed belt on the toothed side on the flat belt of the belt body.

19. The method for producing a toothed belt as claimed in claim 18, wherein the toothed side has at least the minimum thickness (h) of the flexible material of the belt body in the vertical direction (Z) on the at least one tension member.

20. The method for producing a toothed belt as claimed in claim 18 further comprising applying a fabric to the toothed side of the toothed belt.

* * * * *